Patented May 7, 1929.

1,712,077

UNITED STATES PATENT OFFICE.

CLARENCE E. HRUBESKY AND FREDERICK L. BROWNE, OF MADISON, WISCONSIN.

WATER-RESISTANT ANIMAL GLUE.

No Drawing.    Application filed March 14, 1928.    Serial No. 261,693.

(GRANTED UNDER THE ACT OF MARCH 3, 1883, 22 STAT. L., 625.)

This application is made under act of March 3, 1883, chapter 143 (22 Stat. 625) and the invention herein described and claimed may be used by the Government of the United States or any of its officers or employees in the prosecution of work for the Government or by any other person in the United States without the payment to us of any royalty thereon.

It has been known for many years that animal glue is made water resistant by treatment with formaldehyde. Until recently, however, it has not been found possible to incorporate sufficient quanities of formaldehyde without causing the glue to congeal to an unworkable jelly.

Alfred C. Lindauer and George M. Hunt in U. S. Patent No. 1,506,013 dated August 26, 1924, found that paraformaldehyde can be incorporated in a solution of animal glue giving a glue which remains in a workable condition for some time and finally sets to a jelly and with which joints made during the period of its working life are highly water resistant. We have found that similar results may be obtained by using, in place of paraformaldehyde, compounds of formaldehyde with other substances, for example hexamethylenetetramine, methylal, or formaldehyde aniline.

Although the working life of animal glue solutions containing paraformaldehyde or a compound of formaldehyde is long enough to make them practicable for some woodworking purposes, they would be more useful if the working life were still longer. We find and claim as our new invention that the working life of animal glue solutions made water resistant by the addition of paraformaldehyde or of a compound of formaldehyde can be prolonged by adding also a suitable amount of acid.

In describing our invention it is understood that the term animal glue is used to include all those materials usually obtained by extracting animal tissue with hot water, consisting chiefly of protein or protein decomposition products, which have the property of absorbing water, "melting" when warmed, and congealing to a jelly on cooling. Hide glue, bone glue, fish glue, and gelatine are comprised by this definition.

We recognize that the paraformaldehyde of commerce may not be a single, definite chemical compound but a mixture of polyoxymethylenes in varying proportions. Certainly different samples of the paraformaldehyde of commerce vary materially in the rate at which they cause an animal glue solution to congeal to a jelly. The term paraformaldehyde as we use it means a polymer of formaldehyde which, when mixed with a solution of animal glue, causes the glue solution to congeal slowly to a jelly, presumably because the polymer breaks up slowly into formaldehyde which then reacts with the glue.

The term compound of formaldehyde with other substances as used in this specification is restricted to those compounds capable of breaking up into formaldahyde and the other substance again on contact with water. Artificial resins such as those made by the reacation of formaldehyde and phenols are not included in the designation as we use it because they do not regenerate formaldehyde under these conditions.

The term working life as we use it means the period of time elapsing between the incorporation of the paraformaldehyde, or compound of formaldehyde, and the acid and the congealing of the mixture to a jelly. It should be understood that our invention is a fluid glue solution that has a viscosity during its working life very similar to the viscosity of the ordinary, non water resistant animal glue as used in woodworking and that can be applied by the machinery and the technic employed in the woodworking industries. In this respect our invention is to be distinguished clearly from other inventions in which the glue is first caused to set to a jelly by the action of formaldehyde or other agent and is then applied while in the jellied condition.

Although we describe our invention with particular reference to the use of animal glue in woodworking, we do not restrict it to that art. Our invention can be practiced in any art for which it is customary to use the animal glue of commerce, except where the poisonous nature of formaldehyde, its polymers and compounds, renders our glue unsuitable.

Any acid may be used in practicing our invention provided only that it be soluble in water and compatible with animal glue solution at temperatures between customary room temperatures and the boiling point of water. We have used such diverse acids as oxalic acid, tartaric acid, mucic acid, citric acid, benzoic acid, acetic acid, hydrohloric acid, and phosphoric acid. It should be noted that our invention has nothing in common with the well known practice of hydrolyzing animal glue by heating with larger quantities of acid then we employ, for the purpose of destroying the property of animal glue of congealing when its solution is cooled to customary room temperatures, thereby producing a so-called liquid glue. We restrict our practice to such moderate proportions of acid that hydrolysis during the working life of the glue is not significant and the glue solution retains its property of congealing when cooled, provided only that the grade of glue used to start out with is such that its solution in pure water is a jelly at room temperature. What we mean in this specification by a suitable proportion of acid can be defined more easily after we have described specific examples of the practice of our invention.

*Example 1.*—Let 100 parts by weight of animal glue soak in 225 parts by weight of cold water until the granules of glue are thoroughly saturated with water and softened. Then warm the mixture by placing the container in a bath of water at about 60 degrees centigrade. In a few minutes the glue will melt and form a glue solution such as has been used in woodworking practice for many years for making joints. The temperature should then be changed to about 45 degrees centigrade by changing the temperature of the water bath. Now add 10 parts by weight of commercial paraformaldehyde and 5.5 parts by weight of crystallized oxalic acid and stir the mixture until the oxalic acid dissolves and the paraformaldehyde is uniformly dispersed throughout the mixture. The glue is then ready to use. During the period of its working life this mixture has all of the essential physical characteristics of an ordinary animal glue solution (that is, a solution of animal glue in pure water). At 45 degrees centigrade it is a fluid having a viscosity similar to that of an ordinary glue solution at about 60 degrees centigrade, so that it can be applied in exactly the same way to wood surfaces for the purpose of joining them. As in the case of ordinary glue solution, the viscosity can be increased by using a glue of higher grade to begin with, or by using less water for soaking the glue. On cooling the mixture to customary room temperature, say 20 degrees centigrade, it congeals to a firm jelly and on warming it to 45 degrees again it remelts, just as an ordinary glue solution does. But after the mixture has been kept at 45 degrees for the period of its working life it begins to thicken rapidly and soon congeals to a firm jelly that cannot be remelted even if heated to the boiling point of water. If the mixture is kept at a temperature higher than 45 degrees centigrade during its working life, the working life will be somewhat shorter. With some kinds of commercial paraformaldehyde the working life at 45 degrees of this mixture is about 8½ hours. With other, less desirable kinds of paraformaldehyde the working life may be as short at 2½ to 3 hours.

*Example 2.*—Let 100 parts by weight of animal glue soak in 225 parts by weight of cold water until the granules of glue are thoroughly saturated with water and softened. Then warm the mixture by placing the container in a bath of water at about 60 degrees centigrade. In a few minutes the glue will melt and form a glue solution such as has been used for a long time for making joints in woodworking practice. The temperature should then be changed to about 45 degrees centigrade by changing the temperature of the water bath. Now add 10 parts by weight of commercial paraformaldehyde and 8 parts by weight of tartaric acid and stir the mixture until the tartaric acid dissolves and the paraformaldehyde is uniformly dispersed throughout the mixture. The glue is then ready to use. In its physical behavior this mixture is similiar to the mixture described in Example 1 except that its working life is about 6½ hours when using the same kind of paraformaldehyde which in the mixture of Example 1 gives a working life of 8½ hours.

Within a definite limit the working life of a mixture of animal glue solution with paraformaldehyde and an acid, or animal glue solution with a compound of formaldehyde and an acid, is roughly proportional to the amount of the acid added. Thus in Example 1 the working life may be ¾ hour when no oxalic acid at all is added to the mixture of animal glue solution and paraformaldehyde, 2½ hours when 1 part of oxalic acid is added, 5½ hours when 3½ parts of oxalic acid are added, and 8½ hours when 5 to 7 parts of oxalic acid are added. Further addition of oxalic acid decreases the working life again, for with 10 grams of oxalic acid the working life will be found to be only 6 hours and with 15 grams of oxalic acid it is only 4½ hours. Similarly in Example 2 the longest working life is obtained when 7 to 9 parts of tartaric acid are used, and the working life is shorter if the quantity of tartaric acid is either increased or decreased. The term suitable proportion of acid as used in this specification means that proportion of acid giving the longest working life or a smaller amount; in the case of oxalic acid 7 parts or less is a suitable amount, in the case of tartaric acid 9 parts or less is a suitable amount.

We make the following claims for our invention:

1. A water resistant glue the composition of which consists essentially of animal glue, water, paraformaldehyde, and a suitable amount of acid.

2. A water resistant glue the composition of which consists essentially of animal glue, water, a compound of formaldehyde and a suitable amount of acid.

3. A water resistant glue the composition of which consists essentially of 100 parts by weight of animal glue, 225 parts by weight of water, 10 parts by weight of paraformaldehyde, and 5 to 7 parts by weight of oxalic acid.

CLARENCE E. HRUBESKY.
FREDERICK L. BROWNE.